(12) United States Patent
Kraus

(10) Patent No.: US 7,647,893 B2
(45) Date of Patent: Jan. 19, 2010

(54) CORRUGATED CARDBOARD ASSEMBLY AND METHOD FOR MAKING THE SAME

(75) Inventor: Michael E. Kraus, Jackson, WI (US)

(73) Assignee: Great Lakes Packaging Corporation, Germantown, WI (US)

( * ) Notice: Subject to any disclaimer, the term of this patent is extended or adjusted under 35 U.S.C. 154(b) by 0 days.

(21) Appl. No.: 12/125,406

(22) Filed: May 22, 2008

(65) Prior Publication Data
US 2008/0290150 A1    Nov. 27, 2008

Related U.S. Application Data

(60) Provisional application No. 60/939,721, filed on May 23, 2007.

(51) Int. Cl.
*A01K 15/02* (2006.01)
(52) U.S. Cl. .................. 119/706; 119/702; 229/127; 229/169
(58) Field of Classification Search .............. 206/521, 206/445, 447, 215, 476, 493, 1.5, 514, 523; 119/702, 706; 229/127, 169
See application file for complete search history.

(56) References Cited

U.S. PATENT DOCUMENTS

| | | | |
|---|---|---|---|
| 1,352,833 A | | 9/1920 | Robinson |
| 2,122,654 A | * | 7/1938 | Nickerson ............... 229/117.17 |
| 2,235,800 A | * | 3/1941 | Daly .......................... 229/104 |
| 2,657,849 A | * | 11/1953 | Paul ........................... 229/112 |
| 2,936,102 A | | 5/1960 | Field |
| 3,343,744 A | | 9/1967 | Morell et al |
| 3,486,485 A | * | 12/1969 | Kahanick .................... 119/706 |
| 3,899,121 A | | 8/1975 | Herbetko |
| 3,993,027 A | * | 11/1976 | Mullin ........................ 119/706 |
| 4,391,223 A | | 7/1983 | Holland et al. |
| 4,520,758 A | | 6/1985 | Pfriender |
| 4,803,952 A | | 2/1989 | Houser |
| 5,167,205 A | | 12/1992 | Bell et al. |
| 5,415,344 A | * | 5/1995 | Harrelson .................... 229/169 |
| 5,465,686 A | | 11/1995 | Monetti et al. |

(Continued)

FOREIGN PATENT DOCUMENTS

FR    2618050    1/1989

*Primary Examiner*—Mickey Yu
*Assistant Examiner*—Chun Cheung
(74) *Attorney, Agent, or Firm*—Joseph S. Heino; Patrick M. Bergin

(57) ABSTRACT

A corrugated cardboard assembly having a plurality of adjacent sheets of corrugated cardboard arranged in a layered fashion to form a corrugated block. The adjacent sheets are not attached to one another using any adhesive. Instead, the block formed by the layered, adjacent sheets of corrugated cardboard is enveloped by a wrap-around carton that maintains the adjacent positioning of the sheets. The sheets, individually and collectively, include at least one opposing straight, narrow cut, opening, aperture, or "slit," that is defined within them. The wrap-around carton includes interlocking portions of the carton in combination with a longitudinally extending slot that is formed by the slits that are defined within each of the adjacent sheets of corrugated cardboard. In this fashion, the block formed by the adjacent sheets is maintained without the use of extra glue or adhesive to maintain the structural integrity of the block of adjacent sheets.

13 Claims, 6 Drawing Sheets

U.S. PATENT DOCUMENTS

| | | | |
|---|---|---|---|
| 5,690,272 A * | 11/1997 | England | 229/122.24 |
| 5,832,869 A | 11/1998 | Franczak et al. | |
| 7,011,043 B2 * | 3/2006 | Diep | 119/601 |
| 7,117,821 B2 * | 10/2006 | Novak | 119/706 |
| 7,134,404 B2 | 11/2006 | Slone | |
| 7,156,050 B2 | 1/2007 | Scott et al. | |
| 2003/0024971 A1 | 2/2003 | Jones et al. | |
| 2004/0211825 A1 | 10/2004 | Champion et al. | |
| 2005/0132972 A1 | 6/2005 | Scott et al. | |

\* cited by examiner

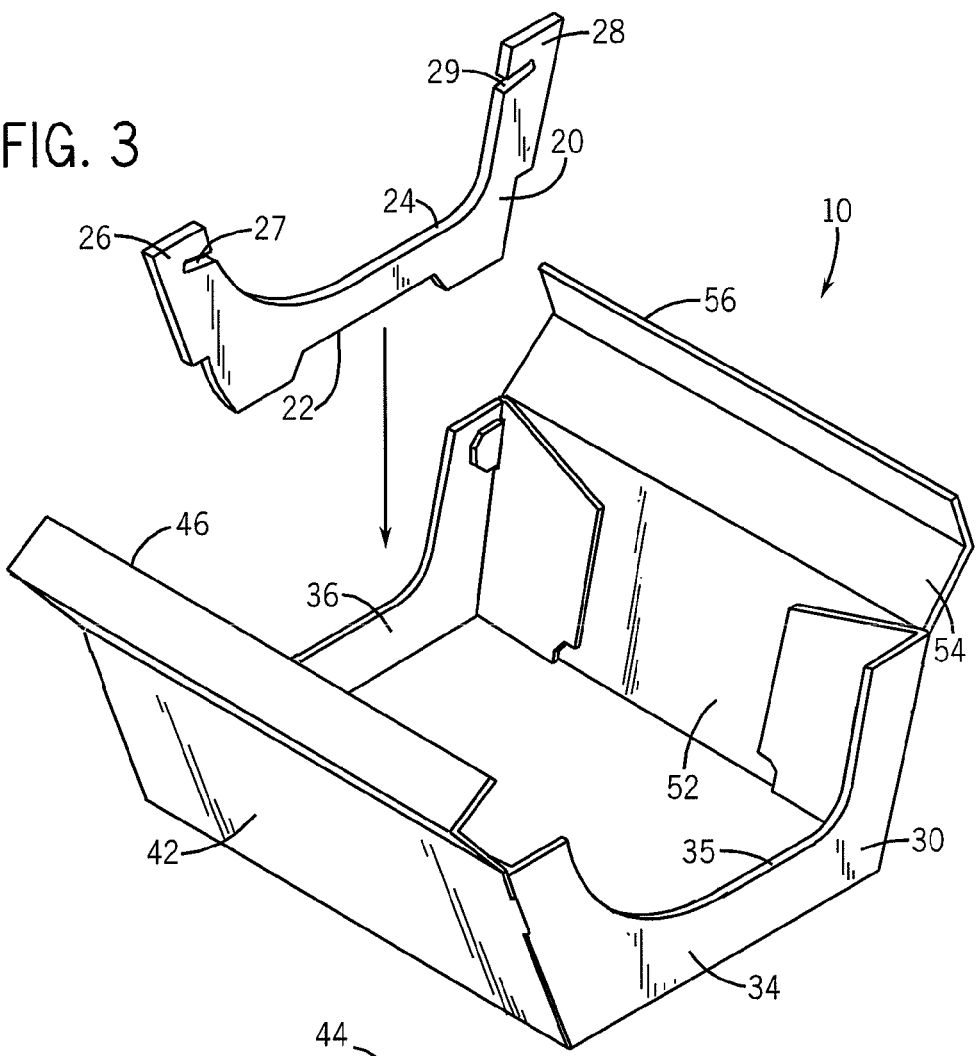
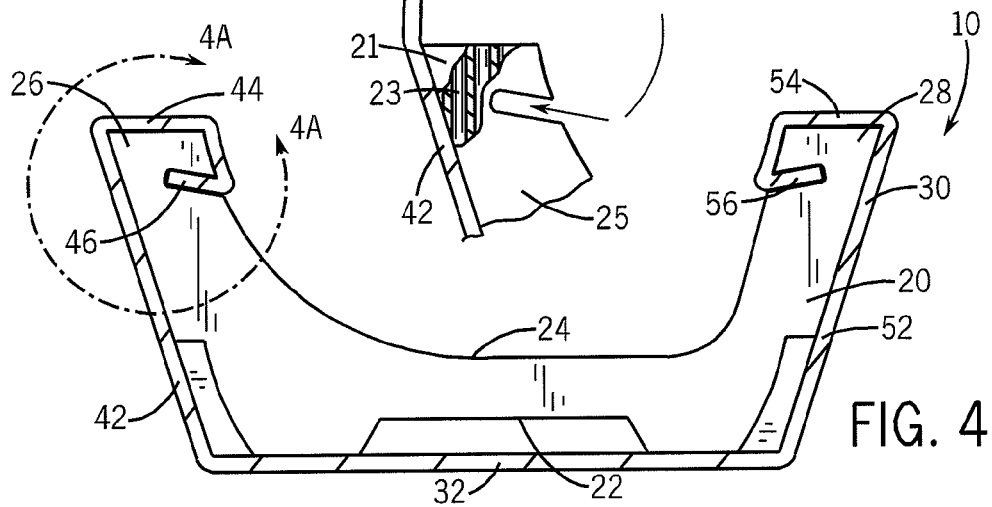

CORRUGATED CARDBOARD ASSEMBLY AND METHOD FOR MAKING THE SAME

This application claims the benefit and priority of U.S. Provisional Patent Application No. 60/939,721 filed May 23, 2007.

FIELD OF THE INVENTION

The present invention relates generally to corrugated cardboard and to assemblies that use corrugated cardboard as a material of construction. More specifically, the present invention relates to corrugated cardboard assemblies that use a plurality of adjacent sheets of corrugated cardboard to form a corrugated block or similar structure, the block being enveloped in a wrap-around carton and the carton having means for interlocking the carton with the plurality of adjacent sheets of corrugated cardboard. It also specifically relates to a method for making such assemblies.

BACKGROUND OF THE INVENTION

Cardboard and corrugated cardboard are well known in the art. Indeed, the first form of corrugated, or pleated, paper was patented in 1871 under U.S. Pat. No. 122,023 to Jones. This paper was soon to be improved upon under U.S. Pat. No. 150,588 to Long which issued in 1874. The patent to Long discloses a filler layer, which could be corrugated board, with liner sheets disposed on each side. This is essentially the corrugated cardboard that we know and use today.

With the advent of corrugated cardboard and the recognition of its associated strength, corrugated boxes and containers began replacing wooden crates and the like in the early part of the $20^{th}$ century, and such use continues in the packaging industry today. Corrugated cardboard is manufactured today using high-precision machinery lines, appropriately called "corrugators," that can run at production speeds of 500 linear feet per minute, or even faster. The corrugated medium arrives at the corrugator on large rolls, is heated, moistened and formed into a fluted pattern on meshing geared wheels. This is attached to a first flat facing of liner-board with an adhesive to form "single face" board. A second flat facing of liner-board is similarly attached to the other side of the fluted medium to form "single wall" corrugated board or "cardboard," which is really a misnomer in that "cardboard" is a generic lay term used to refer to any heavy paper or pulp-based board. The flat facing of liner-board can be formed from any number and grades of paper or pulp-based board, including bleached white, colored or even pre-printed board. Additionally, "double wall" corrugated cardboard can be formed from three sheets of liner-board and two fluted mediums in between them and "triple wall" corrugated cardboard can be formed from four sheets of liner-board and three fluted mediums between them, and so on. The assembly and method of the present invention is not limited to any one type of such corrugated cardboard.

It is also well known in the art that old corrugated cardboard sheets and containers made from them are an excellent source of paper fibers for re-cycling purposes. Such sheets and containers can be re-pulped in large vats of water where extraneous materials are filtered out. The resulting paper pulp "slurry" can then be used to make new paper and cardboard products. Such re-cycling helps with the preservation and conservation of wood resources and even helps areas without sustainable wood resources to build paper and packaging industries locally. The paper and packaging industries are receiving increased attention today as manufacturers faced with environmental, health and regulatory issues continue to look more closely to renewable and sustainable resources to meet increased demands for production. The need to use wholly or partially re-cycled paper-based products will increase to meet those demands.

In the packaging industry, it is also known in the art that a plurality of adjacent sheets of corrugated cardboard can be glued or adhered together with some sort of adhesive to form a relatively strong and laminated support structure. That is, one layer of corrugated cardboard may be glued to the next layer, and so on, to form a "block" of corrugated cardboard material. The process of forming such blocks, however, is a very time consuming and relatively expensive process, primarily due to the amount of glue that must be used and the way in which the glue or other adhesive must be evenly applied. This process is time consuming because, following application of the glue that binds the layers together, the glue must also dry prior to use of the block of corrugated material. The added adhesives and glues that are used also makes the resulting product one that does not lend itself well to the process of re-cycling since the added adhesives and glues constitute contaminants that require even further filtering of the paper pulp slurry during the re-cycling process.

Accordingly, it is an object of the present invention to provide a corrugated cardboard assembly that allows a plurality of adjacent sheets of corrugated cardboard to form a corrugated block or similar structure without the need to use extra adhesives to glue the adjacent sheets together. It is another object of the present invention to provide the methodology for constructing such a structure whereby structural integrity is maintained.

SUMMARY OF THE INVENTION

The corrugated cardboard assembly and method of the present invention has obtained these objects. It provides for a corrugated cardboard assembly that comprises a plurality of adjacent sheets of corrugated cardboard that are arranged in a layered fashion to form a corrugated block or similar structure. In the assembly of the present invention, the plurality of adjacent sheets of corrugated cardboard are not glued or otherwise attached to one another using an adhesive. Instead, the block formed by the layered, adjacent sheets of corrugated cardboard is enveloped in a wrap-around carton. This wrap-around carton maintains the adjacent positioning and alignment of the sheets. The sheets, individually and collectively, include a pair of opposing straight, narrow cuts, openings, apertures, or "slits," that are defined within them. The wrap-around carton includes means for interlocking a portion of the carton with a longitudinally-extending slot that is formed by a plurality of linearly-aligned and adjacent slits that are defined within each of the plurality of adjacent sheets of corrugated cardboard. In this fashion, the block formed by the adjacent sheets is maintained without the use of extra glue or adhesive to maintain the structural integrity of the block of adjacent sheets. The present invention is drawn to the resulting assembly and to the method for constructing the assembly.

The foregoing and other features of the assembly and method of the present invention will be apparent from the detailed description that follows.

BRIEF DESCRIPTION OF THE DRAWINGS

FIG. 3 is the same view of the first embodiment of the assembly that is illustrated in FIGS. 1 and 2 and showing how stamped sheets of corrugated cardboard are vertically aligned within the assembly.

FIG. 4 is a slightly enlarged and cross-sectioned front elevational view of the first embodiment of the assembly and taken along line 4-4 of FIG. 1.

FIG. 4A is a partially cross-sectioned front elevational view of one portion of the first embodiment of the assembly of the present invention taken along line 4A-4A of FIG. 4.

DETAILED DESCRIPTION

Figure 1:
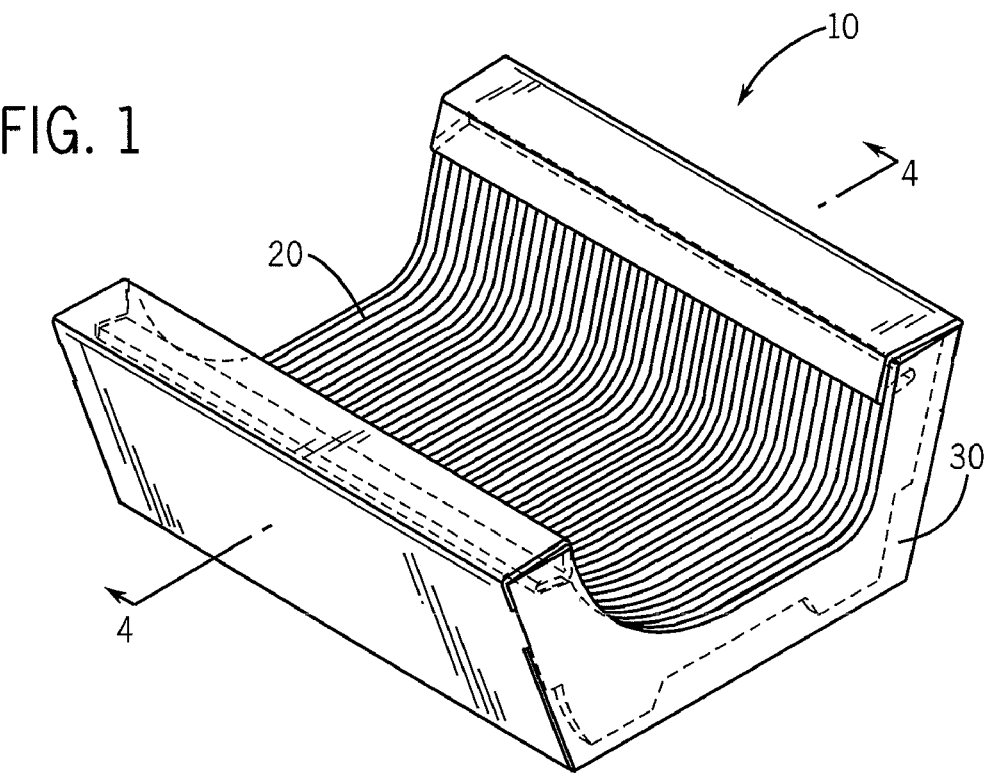
FIG. 1 is a left side, front and top perspective view of a first embodiment of a fully-completed representative assembly constructed in accordance with the method of the present invention.

Referring now to the drawings in detail, wherein like numbered elements refer to like elements throughout, FIGS. 1 through 6 illustrate a representative structure, generally identified 10, which is the first embodiment of an assembly that is constructed in accordance with the method of the present invention. In its three-dimensional form as shown in FIG. 1, the structure, or assembly, 10 is intended to serve as a "perch" or support structure for a pet, such as a cat. While this use-specific assembly 10 is disclosed as a first preferred embodiment of an assembly that is constructed in accordance with the method of the present invention, it is to be understood by those skilled in the art that the present invention is not limited to either this assembly 10 or to the second embodiment of an assembly that will be discussed later in this detailed description. It is to be understood that the structures or assemblies that may be fabricated in accordance with the present invention are not limited to any physical size or to any particular shape, which size and shape may be dictated by the particular use or purpose that such structures or assemblies may be constructed for. Accordingly, it is to be appreciated that the embodiments disclosed are for purposes of illustration only and are in no way limiting of the method of the present invention or of any assembly that could be constructed in accordance with it. They are merely representative of the wide variety of assemblies that could be constructed using the method of this invention.

Figure 2:
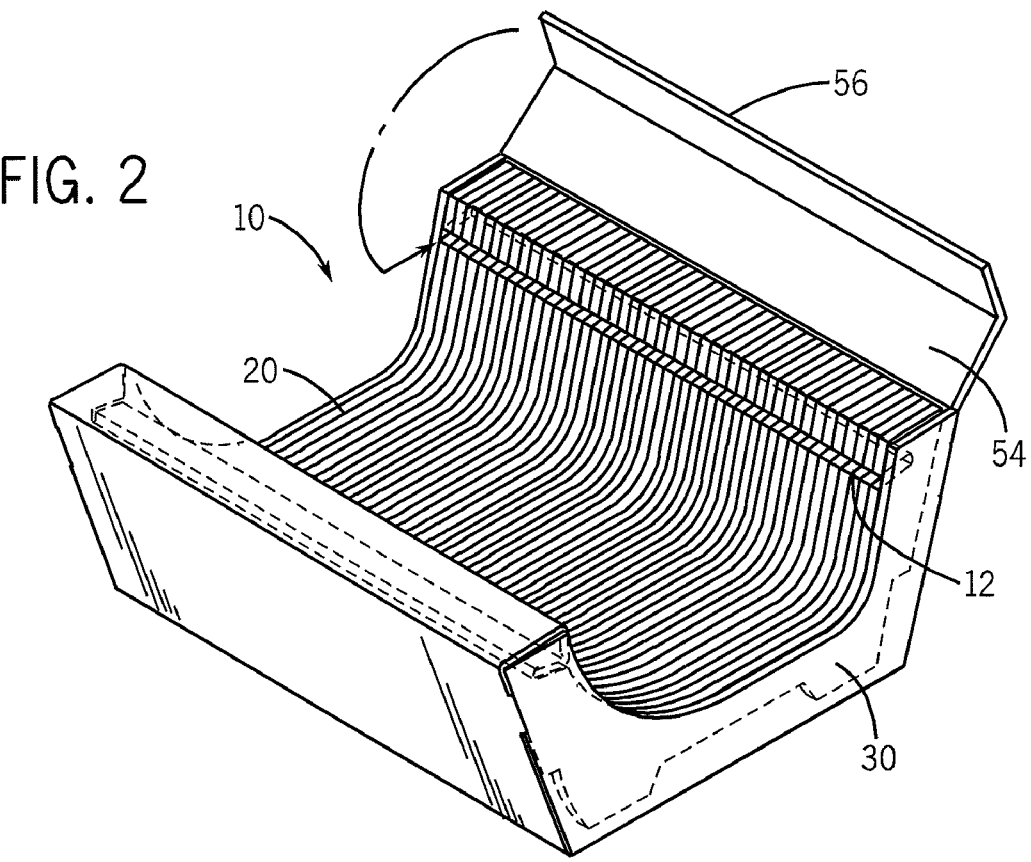
FIG. 2 is the same view of the first embodiment of the assembly that is illustrated in FIG. 1 and showing a portion of it partially disassembled.

Referring to FIGS. 1 through 3, it will be seen that the assembly 10 is partly comprised of an array, or plurality, of individual die-cut corrugated cardboard sheets 20. As shown in the partially-sectioned view of FIG. 4A, each corrugated cardboard sheet 20 is comprised of a conventional single wall corrugated cardboard. That is, it has a first flat facing of liner-board 21 attached with an adhesive to one side of a vertically-corrugated or fluted medium 23 and a second flat facing of liner-board 25 attached to the other side of the fluted medium 23 to form what is conventionally referred to as "single wall" corrugated cardboard 20. However, it is to be understood that the assembly and method of the present invention is not limited to a single wall construction and any double wall, triple wall, or other multi-layered corrugated cardboard sheet could be utilized without deviating from the scope of the present invention, although such construction would not be desirable in the view of the inventor. Such construction would require additional adhesives, which this invention is attempting to minimize.

Figure 6:
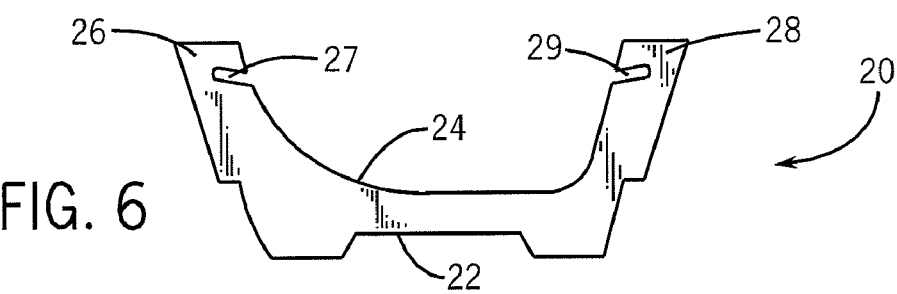
FIG. 6 is a front elevational view of one of the sheets of corrugated cardboard utilized in the first embodiment of the assembly of the present invention.

As shown in FIG. 6, each sheet 20 is substantially like-configured and formed as a generally U-shaped sheet having a bottom sheet edge 22 and an upper sheet edge 24. The upper sheet edge 24 comprises a curved shape and terminates in a pair of upper sheet legs 26, 28. The first upper sheet leg 26 has a straight, narrow cut, opening or aperture, or what will be referred to herein as a "slit," 27 cut into it at the upper sheet edge 24. Similarly, the second upper sheet leg 28 has a slit 29 cut into it at the upper sheet edge 24. See also FIGS. 4 and 4A. Note that each slit 27, 29 is angled slightly upwardly relative to the horizontal as one moves away from the upper sheet edge 24 and inwardly of the upper sheet legs 26, 28, respectively. The purpose and function of these upwardly-angular voids will be apparent later in this detailed description.

Figure 5:
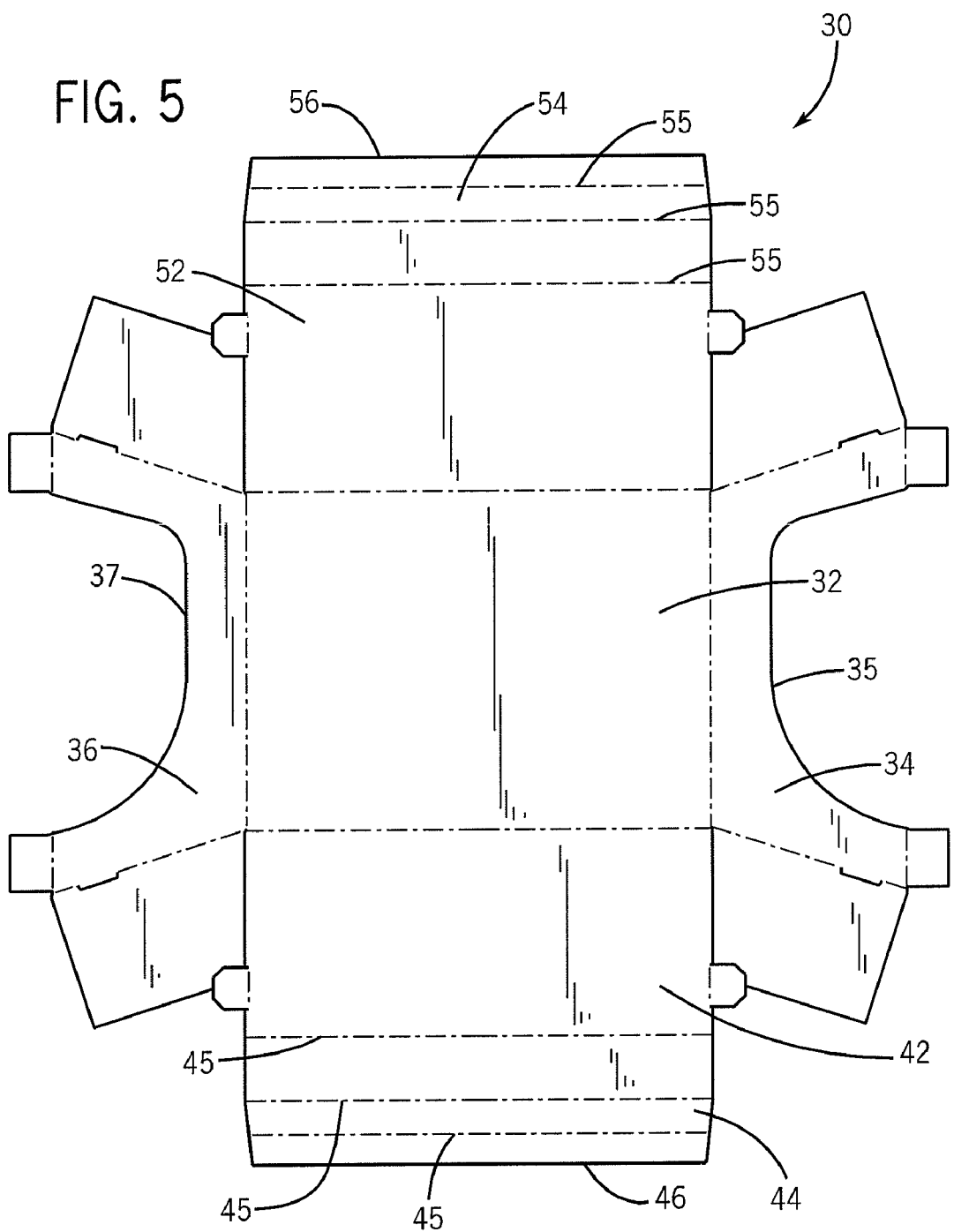
FIG. 5 is a top plan view of the wrap-around carton utilized in the first embodiment of the assembly of the present invention and showing the carton in its pre-folded condition.

The first embodiment assembly 10 is further comprised of a wrap-around carton member 30. See FIG. 3. This wrap-around carton member 30 starts out as a die-cut corrugated sheet as shown in FIG. 5. The wrap-around carton member 30 includes a bottom floor 32, a front face portion 34, a rear face portion 36, a first side face 42 and a second side face 52. The uppermost edge 35 of the front face portion 34 and uppermost edge 37 of the rear face portion 36 are cut to match the profile of the curved shape of the upper sheet edge 24 of each sheet 20 of corrugated cardboard. The first side face 42 also includes a foldable extension portion 44 and a leading lip 46. A plurality of creases 45 are defined within the foldable extension portion 44 of the first side face 42. Similarly, the second side face 52 includes a foldable extension portion 54 and leading lip 56. Formed within the foldable extension portion 54 of the second side face 52 are a plurality of creases 55.

During the construction of the first embodiment of the assembly 10 of the present invention, it is assumed that a plurality of sheets 20 and a wrap-around 30 have been die cut from conventional stock. As shown in FIG. 5, the cut wrap-around 30 can be folded along a plurality of creases (illustrated by dotted lines) which, when properly folded, resemble the up right wrap-around 30 as is illustrated in FIG. 3. At this point, a plurality of corrugated cardboard sheets 20 can be placed into the wrap-around carton member 30 as is also shown in FIG. 3. This plurality of individual sheets 20 forms an array of side-by-side, or layered, sheets 20. When a sufficient number of corrugated sheets 20 have been inserted into the wrap-around carton member 30 to fill it up, the near-completed assembly 10 will resemble that which is illustrated in FIG. 2. The assembly 10 is completed by inserting the leading lips 46, 56 of the first and second side faces 42, 52, respectively, into the individual slits 27, 29 that are defined within the sheets 20. See FIG. 4A in this regard. The individual slits 29 of the adjacent sheets 20 together form a longitudinally-extending and continuous slot 12. See FIGS. 1 and 2. It is to be understood that the individual slits 27 opposite the slot 12 form a like-configured slot (not shown) to that side of the assembly 10.

At the point of complete assembly, for example, the leading lip 56 will be biased within the plurality of aligned slits 29 thereby exerting resistance on the leading lip 56 such that the lip 56 will not be able to be easily withdrawn from the slits 29 or from the slot 12 into which it has been inserted. See FIGS. 2 and 4. The same effect is realized with respect to the opposing lip 46 and its corresponding slits 27 and slot (again, not shown). The assembly 10 is thus completed and the structural integrity of the assembly 10 is maintained because the foldable extension portions 44, 54 of the wrap-around carton 30 capture the legs 26, 28 of the sheets 20 when the lips 46, 56 are retained within their respective slits 27, 29 and slot 12. It is also to be understood that an additional member, or flap (not shown), could be provided which would extend from each of the lips 46, 56. Each flap would be foldable over the lip 46, 56 to provide a substantially "wedge-like" engagement of the lip 46, 56 and flap within the slot 12.

Figure 10:
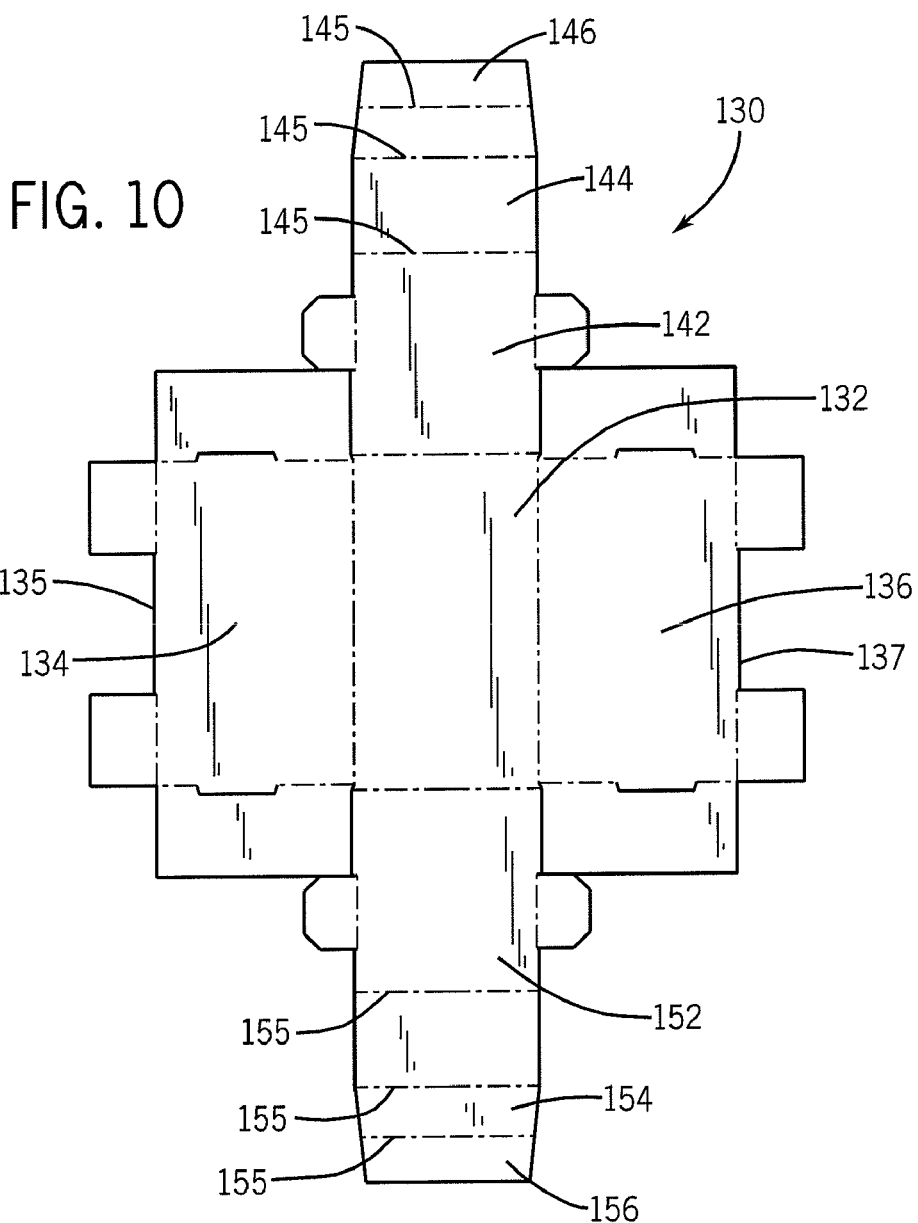
FIG. 10 is a top plan view of the wrap-around carton utilized in the second embodiment of the assembly of the present invention and showing in carton in its pre-folded condition.
Figure 11:
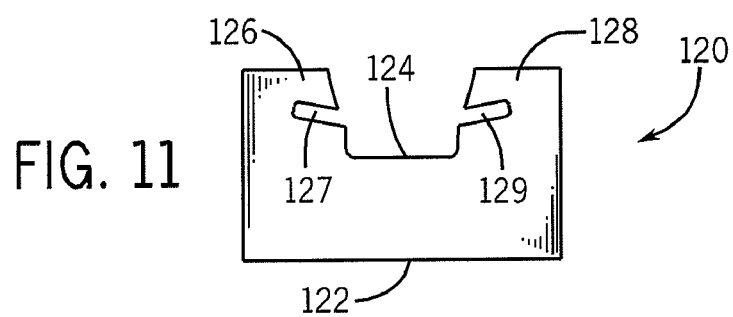
FIG. 11 is a front elevational view of one of the sheets of corrugated cardboard utilized in the second embodiment of the assembly of the present invention.

FIGS. 7 through 11 illustrate a box-like structure, generally identified 110, which is a second embodiment of an assembly that is constructed in accordance with the method of the present invention. As with the first assembly 10, the second assembly 110 is partly comprised of a plurality of die-cut corrugated cardboard sheets 120. See FIGS. 7 and 8. As shown in FIG. 11, each sheet 120 is like-configured to be a generally U-shaped sheet having a bottom sheet edge 122 and an upper sheet edge 124. The upper sheet edge 124 comprises a somewhat squared-off shape centered between a pair of upper sheet legs 126, 128. The first upper sheet leg 126 has a slit 127 cut into it at the upper sheet edge 124. Similarly, the second upper sheet leg 128 has a slit 129 cut into it at the upper sheet edge 124. In this second embodiment, the sheet 120 is symmetrical along its vertical midline. Note also that each slit 127, 129 is again angled slightly upwardly relative to the horizontal as one moves away from the upper sheet edge 124 and inwardly of the upper sheet legs 126, 128, respectively.

Figure 7:
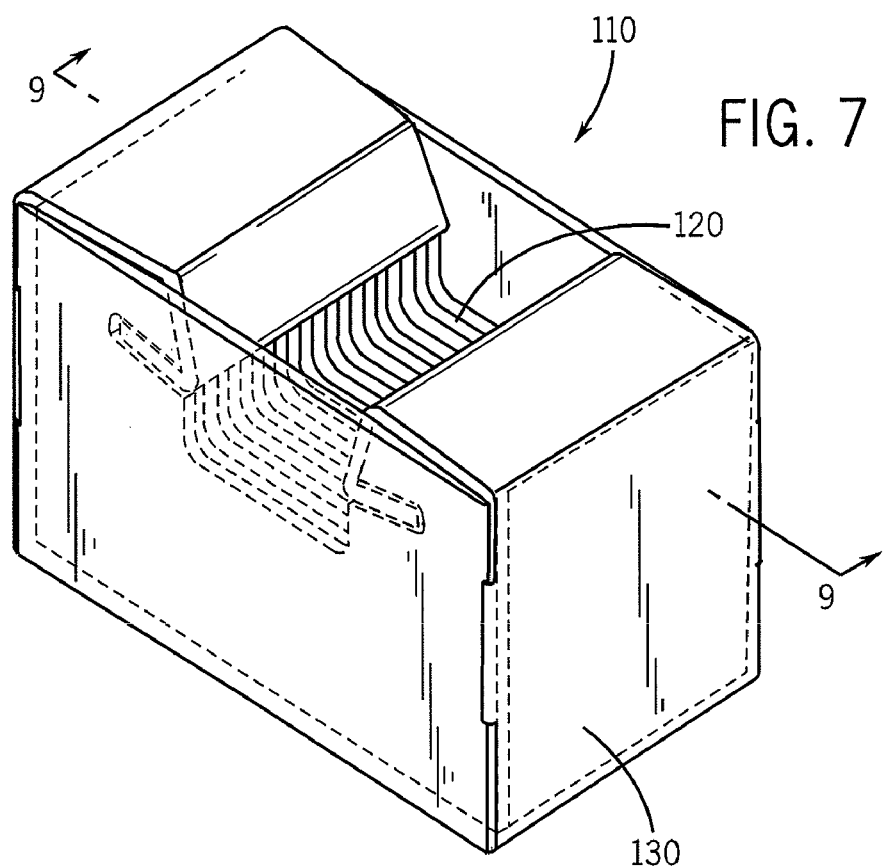
FIG. 7 is a right side, front and top perspective view of a second embodiment of a fully-completed representative assembly constructed in accordance with the method of the present invention.
Figure 9:
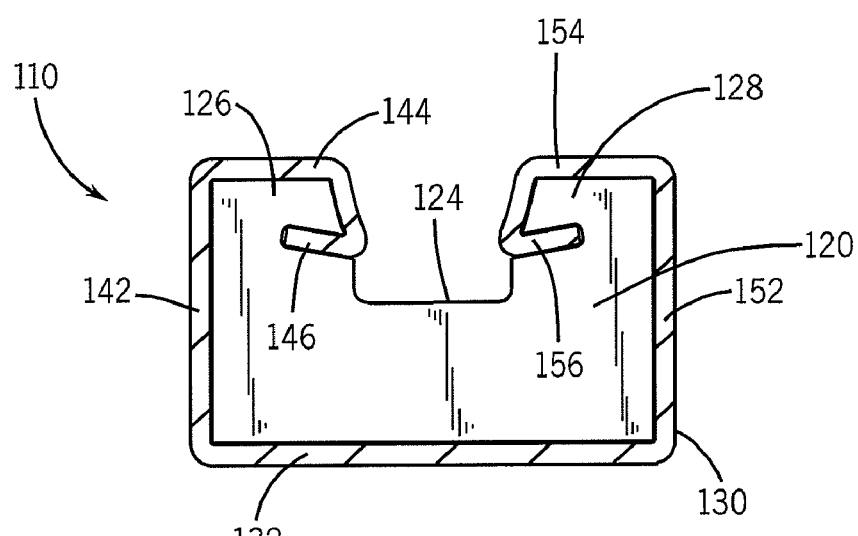
FIG. 9 is a slightly reduced and cross-sectioned front elevational view of the second embodiment of the assembly of the present invention taken along line 9-9 of FIG. 7.

The second embodiment assembly 110 is further comprised of a wrap-around carton member 130. See FIG. 8. This wrap-around carton member 130 also starts out as a die-cut corrugated sheet as is shown in FIG. 10. The wrap-around carton member 130 includes a bottom floor 132, a front face portion 134, a rear face portion 136, a first side face 142 and a second side face 152. The uppermost edge 135 of the front face portion 134 and uppermost edge 137 of the rear face portion 136 are cut to match the overall height of the assembly 110 in its final assembled condition, as is shown in FIG. 7.

Referring again to FIG. 10, it will be seen that the first side face 142 of the second assembly 110 includes a foldable extension portion 144 and a leading lip 146. A plurality of creases 145 are defined within the foldable extension portion 144 of the first side face 142. Similarly, the second side face 152 includes a foldable extension portion 154 and leading lip 156. Defined within the foldable extension portion 154 of the second side face 152 are a plurality of creases 155 as well.

Figure 8:
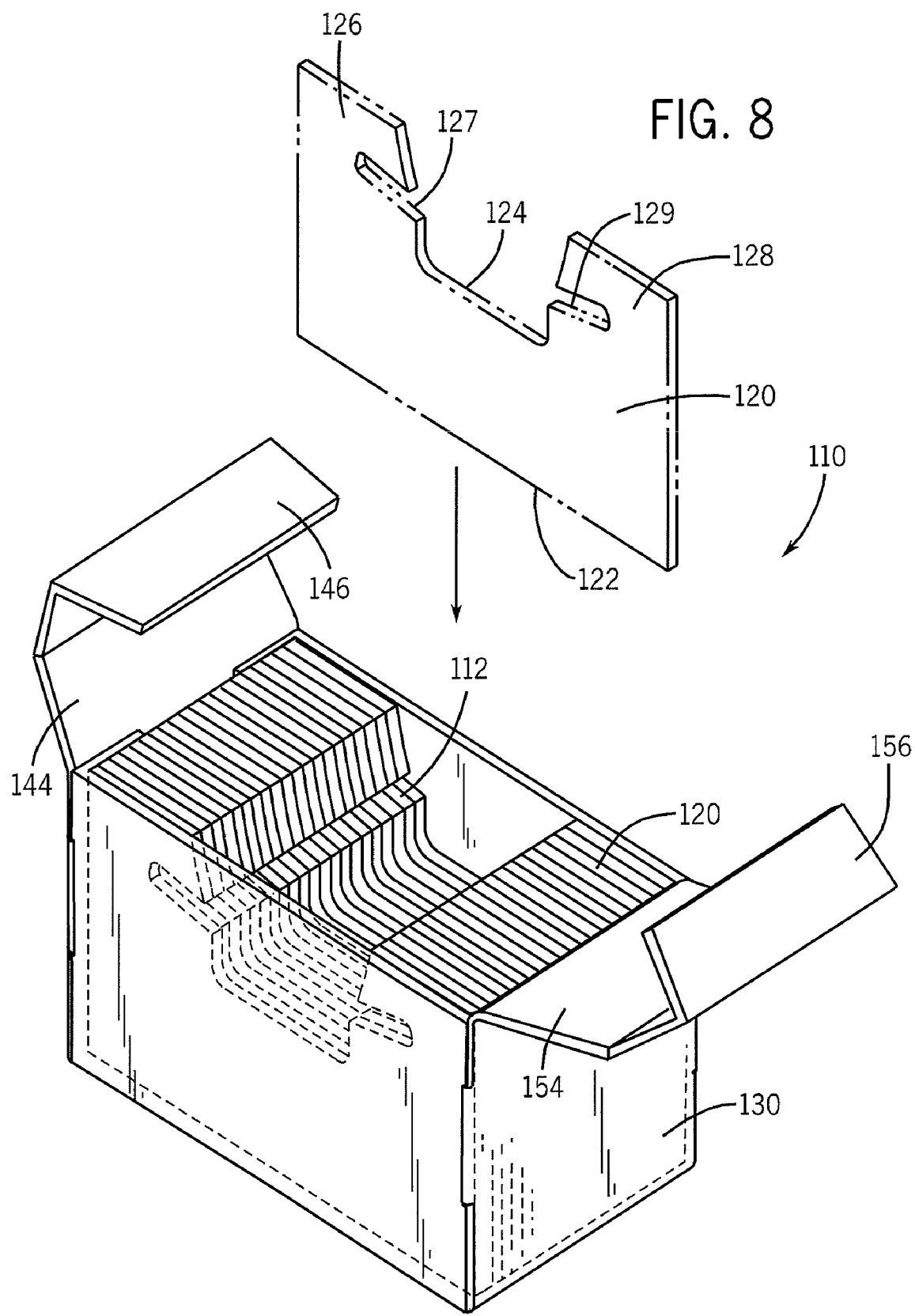
FIG. 8 is the same view of the second embodiment of the assembly that is illustrated in FIG. 7 and showing a portion of it partially disassembled and also showing how stamped sheets of corrugated cardboard are vertically aligned within the assembly.

During the construction of the second embodiment of the assembly 110 of the present invention, it is again assumed that a plurality of sheets 120 and the wrap-around 130 have been die cut from conventional stock. As shown in FIG. 10, it will be appreciated that the cut wrap-around 130 can be folded along a plurality of creases (illustrated by dotted lines) which, when properly folded, resemble the up right wrap-around 130 as is illustrated in FIG. 8. At this point, the plurality of corrugated cardboard sheets 120 are placed vertically into the wrap-around carton member 130. When a sufficient number of corrugated sheets 120 have been inserted into the wrap-around carton member 130, the near-completed assembly 10 will resemble that which is illustrated in FIG. 8.

The assembly 110 is completed save for insertion of the leading lips 146, 156 of the first and second side faces 142, 152, respectively, into the slits 127, 129 that are defined within the sheets 120. See FIG. 7. The individual slits 127 of the adjacent sheets 120 together form a longitudinally-extending and continuous slot 112. See FIG. 8. It is to be understood that the individual slits 129 opposite the slot 112 form a like-configured slot (not shown) to that side of the assembly 110. At the point of complete assembly, the leading lips 146, 156 will be biased within the slits 127, 129 thereby exerting resistance on each of the leading lips 146, 156 such that the lips 146, 156 will not be able to be easily withdrawn from the slits 127, 129 and slot 112 into which each has been inserted. The structural integrity of the assembly 110 is thus maintained because the foldable extension portions 144, 154 of the wrap-around carton 130 effectively "capture" the legs 126, 128 of the sheets 120 when the lips 146, 156 are retained within their respective slits 127, 129 and slot 112. See FIG. 9. Again, it is to be understood that an additional member, or flap (not shown) could be provided with this assembly 110 as well. That is, a flap would extend from each of the lips 146, 156 and would be foldable over the lip 146, 156 to provide a substantially "wedge-like" engagement of the lip 146, 156 and flap within the slot 112. One advantage gained by the assembly 110 is that the sheets 120 may be inserted into the wrap-around carton 130 in either of two front-to-back positions, the sheets 120 being essentially symmetrical about their vertical midline. Such is not, however, a limitation of the present invention.

In view of the foregoing, it will be apparent that there has been provided a new, useful and non-obvious corrugated cardboard assembly that allows a plurality of adjacent sheets of corrugated cardboard to form a corrugated block or similar structure without the need to use extra adhesives to glue the adjacent sheets together and that provides the methodology for constructing such a structure whereby structural integrity is maintained.

The details of the invention having been disclosed in accordance with the foregoing, I claim:

1. A corrugated cardboard assembly that comprises
a plurality of sheets of corrugated cardboard,
a wrap-around carton, and
means for interlocking a portion of the carton with the plurality of cardboard sheets, said sheets are arranged in a layered fashion to substantially fill the carton and the sheets are enveloped by the carton.

2. The assembly of claim 1 wherein each sheet of the plurality of cardboard sheets is substantially similarly configured and wherein each sheet comprises a sheet edge disposed between a pair of sheet legs.

3. The assembly of claim 2 wherein said interlocking means comprises a slit that is defined within each of the sheet legs of each sheet of the plurality of cardboard sheets, each of said slits extending inwardly of the respective sheet leg from the sheet edge and further extending upwardly relative to the horizontal.

4. The assembly of claim 3 wherein said interlocking means further comprises two opposing slots that are formed by the adjacent slits defined in each of the legs of the layered plurality of cardboard sheets.

5. The assembly of claim 4 wherein said interlocking means further comprises two portions of the wrap-around carton, each portion being receivable within one of the two opposing slots formed by adjacent slits defined in each of the legs of the layered plurality of cardboard sheets and each portion being biased within the respective slot whereby the respective carton portion is not easily withdrawn from the slot into which it has been received.

6. A corrugated cardboard assembly that comprises
   a plurality of die-cut corrugated cardboard sheets, each sheet being substantially like-configured and comprising a sheet edge disposed between a pair of sheet legs and a slit defined in each sheet leg, each slit extending inwardly of the respective sheet leg from the sheet edge and being angled, and the plurality of sheets being arranged in a side-by-side layered fashion to form a block of corrugated cardboard material, and
   a die-cut corrugated wrap-around carton member, said carton member being formed with at least one lip, said lip being interlockingly engagable within a slot that is formed by the adjacent slits that are defined within the legs of the plurality of layered cardboard sheets,
   wherein the structural integrity of the assembly is maintained when the wrap-around carton member envelopes the plurality of sheets that substantially fill the carton and the at least one lip of the carton member is engaged with the slot that is formed by the plurality of adjacent slits.

7. The assembly of claim 6 wherein the wrap-around carton member comprises a bottom floor, a front face portion, a rear face portion, a first side face and a second side face, the first side face further comprising a foldable extension portion and a leading lip, and the second side face further comprising a foldable extension portion and a leading lip.

8. The assembly of claim 7 wherein the leading lips of the first and second side faces are each receivable within a slot that is formed by adjacent slits defined within the plurality of sheets.

9. The assembly of claim 8 wherein each slit defined within each sheet is angled upwardly relative to the horizontal to capture the leading lips of the first and second side faces of the carton member.

10. A method of making a corrugated cardboard assembly that comprises the steps of
    providing a plurality of sheets of corrugated cardboard, each sheet being substantially like-configured,
    configuring each sheet to comprise a sheet edge disposed between a pair of sheet legs,
    defining a slit within each sheet leg,
    arranging the plurality of sheets of cardboard in a side-by-side layered fashion to form a block of corrugated cardboard material,
    providing a die-cut corrugated cardboard wrap-around carton member,
    forming at least one lip within the wrap-around carton member,
    enveloping the plurality of cardboard sheets with the wrap-around carton member, and
    interlocking the at least one lip the carton member with a longitudinally-extending slot that is formed by the slits that are defined within the plurality of layered cardboard sheets that substantially fill the carton member.

11. The method of claim 10 wherein the wrap-around carton member providing step further comprises the step of providing a carton member having a bottom floor, a front face portion, a rear face portion, a first side face and a second side face, the first side face further comprising a foldable extension portion and a leading lip, and the second side face further comprising a foldable extension portion and a leading lip.

12. The method of claim 11 wherein the leading lips of the first and second side faces are each receivable within a slot that is formed by adjacent slits defined within the plurality of sheets.

13. The method of claim 12 wherein each slit defined within each sheet is angled upwardly relative to the horizontal to capture the leading lips of the first and second side faces of the carton member.

* * * * *